Figure 5:
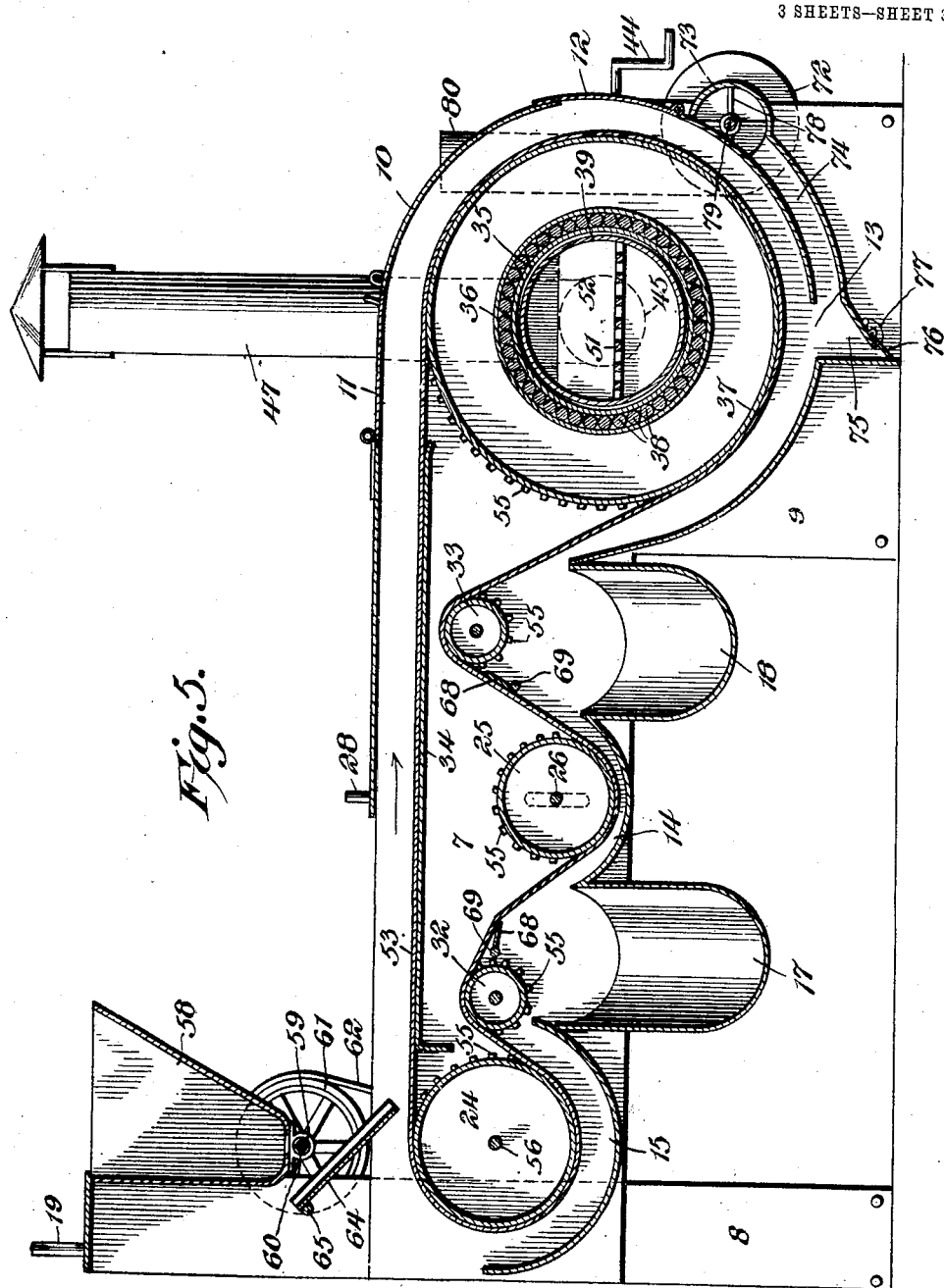

No. 826,191. PATENTED JULY 17, 1906.
E. POTTER.
APPARATUS FOR SEPARATING SEEDS.
APPLICATION FILED SEPT. 29, 1904.
3 SHEETS—SHEET 1.
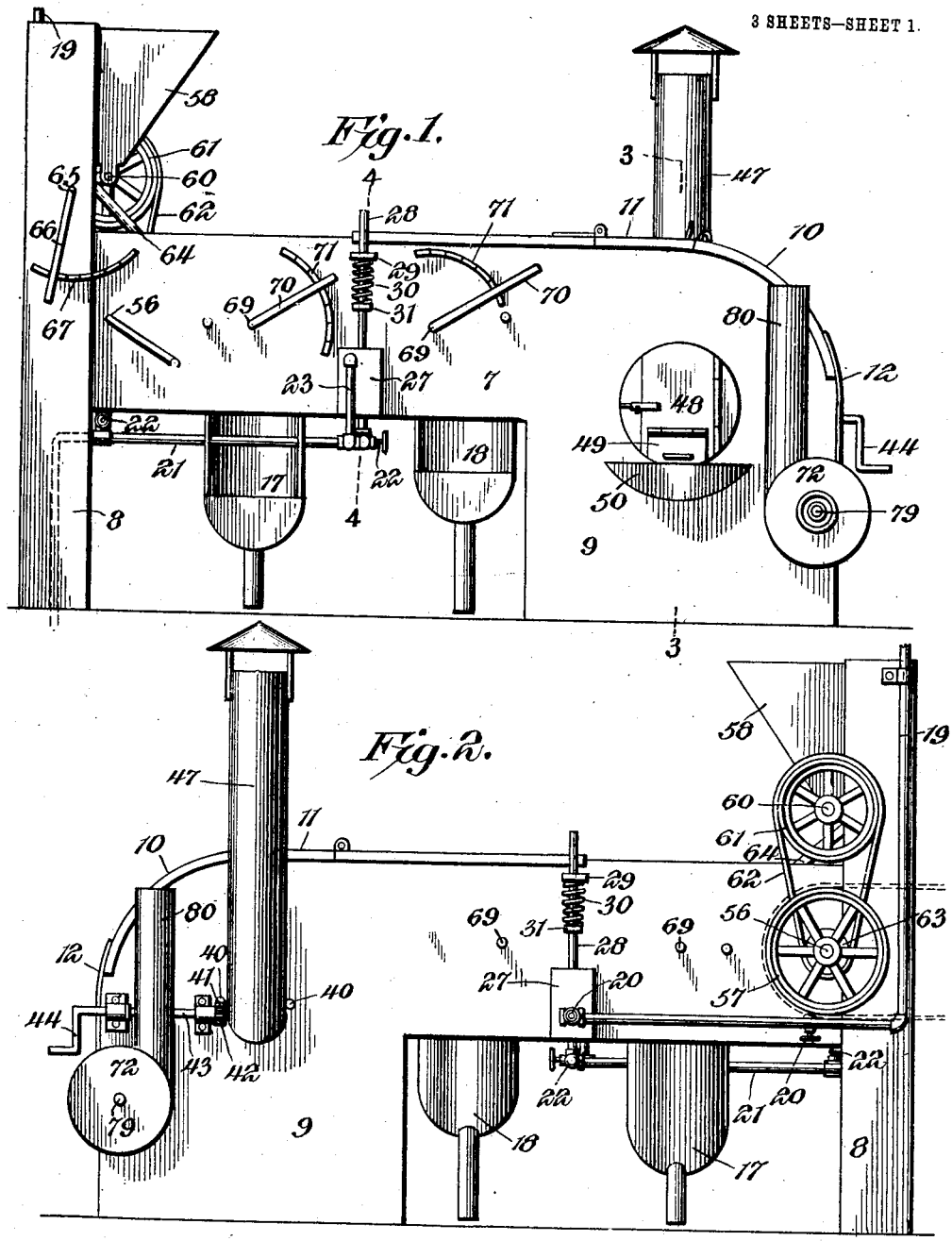
Edson Potter, Inventor,
Witnesses
Howard D. Orr.

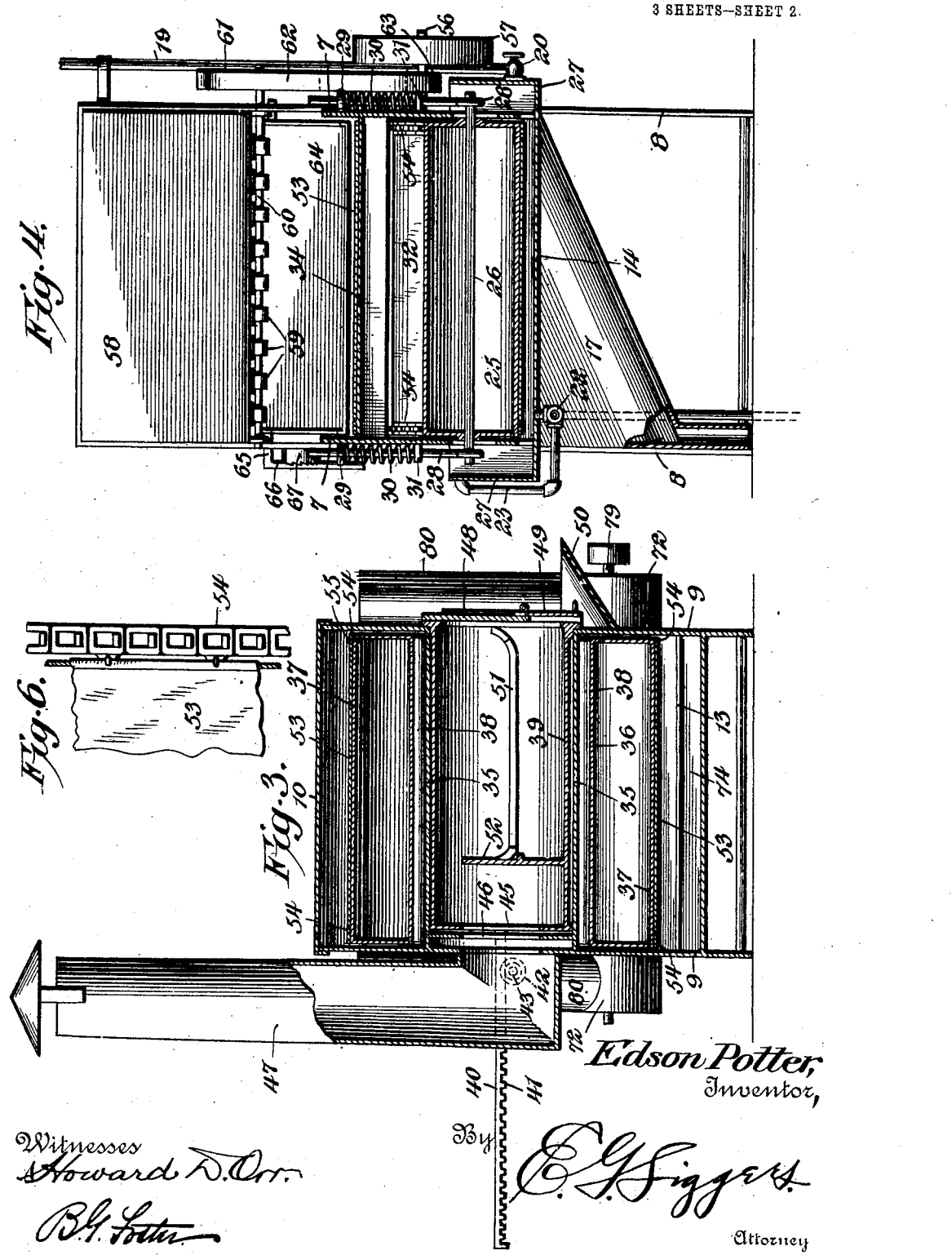

No. 826,191. PATENTED JULY 17, 1906.
E. POTTER.
APPARATUS FOR SEPARATING SEEDS.
APPLICATION FILED SEPT. 29, 1904.

3 SHEETS—SHEET 3.

Edson Potter, Inventor
Witnesses
Howard D. Orr.
B. G. Foster
By E. G. Siggers
Attorney

UNITED STATES PATENT OFFICE.

EDSON POTTER, OF GREENSBURG, INDIANA.

APPARATUS FOR SEPARATING SEEDS.

No. 826,191.        Specification of Letters Patent.        Patented July 17, 1906.

Application filed September 29, 1904. Serial No. 226,476.

*To all whom it may concern:*

Be it known that I, EDSON POTTER, a citizen of the United States, residing at Greensburg, in the county of Decatur and State of Indiana, have invented a new and useful Apparatus for Separating Seeds, of which the following is a specification.

After careful investigation I have found that certain of the obnoxious seed found in desirable seed are mucilaginous in their nature, while that which it is desired to save does not particularly show this characteristic. This peculiarity is found particularly in buckthorn, (the seed of a weed that grows in clover and which becomes mixed therewith,) and the invention hereinafter described in the claims is primarily employed for the separation of the same, though not necessarily limited to these two seeds, as said invention may prove useful in connection with many other kinds.

The aim of the invention is to provide a novel apparatus which makes use of the difference in the mucilaginous nature of different seeds and will effect thorough and proper separation without injuring the same.

The method as preferably employed consists in moistening an endless belt, delivering the grain and seed thereto while wet, and afterward drying the belt. The application of the seed to the moistened belt softens the mucilaginous substance of one kind sufficiently to cause its adherence to the belt, and after the same has been dried this seed will still stick thereto, while the other, not being subject to the same action, will remain free. The latter is thereupon permitted to gravitate from the belt and afterward the adhering seed is scraped from said belt. The quick drying action, beside securing the attachment of one class of seed, furthermore prevents the moisture deleteriously affecting the other.

The preferred embodiment of the apparatus by which the method is accomplished is illustrated in the accompanying drawings; but the invention is not limited to the exact structure shown, as will be apparent upon an inspection of the claims hereto appended.

In the drawings, Figure 1 is a view in elevation of one side of the machine or apparatus. Fig. 2 is a similar view of the opposite side. Fig. 3 is a cross-sectional view on the line 3 3 of Fig. 1. Fig. 4 is a similar view on the line 4 4 of Fig. 1. Fig. 5 is a longitudinal sectional view through the machine. Fig. 6 is a detail view of a portion of the carrier-belt.

Similar reference-numerals indicate corresponding parts in all the figures of the drawings.

In the embodiment illustrated a frame is employed comprising side plates 7, supported at one end by standards 8 and connected at the other end to a casing having end walls 9 and a partially cylindrical wall 10, said wall having a top extension 11, provided with a hinged cover extending partially over the side plates 7. A door 12 is located in the side of the casing, while the bottom is provided with an outlet 13.

Spaced transversely-disposed liquid-reservoirs 14 and 15 are located between the side plates 7 contiguous to their lower edges, and a transversely-inclined chute 17 is arranged between the same. Another chute 18 is disposed between the reservoir 14 and the casing. Water is furnished to the reservoirs 14 and 15 by means of a supply-pipe 19, having valve-controlled communications 20 with said reservoirs. A drain-pipe 21 has valve communications 22 with the lower portions of the reservoirs, while an overflow-pipe 23 connects the upper portion of the reservoir 14 and the pipe 21. A roller 24, journaled in the frame, has its lower portion located in the reservoir 15, while another roller 25 is mounted above and has its lower portion disposed in the reservoir 14. The roller 25 has gudgeons 26, that project through the side plates 7 and are located in boxes 27, communicating with the reservoir, the overflow-pipe 23 preferably being connected to one of these boxes. The gudgeons are journaled in vertically-disposed hanger-rods 28, slidably mounted in ears 29, secured to the side plates 7. The rods are urged downwardly by means of springs 30, coiled thereupon, with their upper ends bearing against the ears 29 and their lower ends bearing against enlargements 31, secured to the rods. An idler-roller 32 is located above the chute 17, preferably at one side of the center of the same, while another idler 33 is journaled above the chute 13. Extending over the rollers 25, 32, and 35 between the side plates 7 is a horizontally-disposed platen 34.

Located concentrically within the casing 9 10 of the frame is a stationary tubular shell or casing 35, constituting an axle upon which the hub 36 of a drum 37 is revolubly mounted, the annular face of said drum being spaced from the walls 10 of the casing and preferably disposed concentric thereto. Roller-bearings 38 are interposed between the hub 36 and tubular shell 35. Means are employed for heating the drum, said means consisting of a furnace having a tubular fire-box 39 located in the casing of the shell 35 and removable therefrom. Guide-rods 40, projecting from the inner end of the fire-box, extend through one side wall of the casing, and one of the rods is provided with a rack 41, engaged by a pinion 42, carried upon an actuating-shaft 43, having a crank-handle 44. The end of the fire-box 39 having the guide-rods is provided with an opening 45, constituting a smoke-outlet, a similar opening 46 being located in the head of the tubular casing and communicating with a smoke-stack 47, mounted at one side of the frame. The opposite end of the fire-box has a door 48, provided with a suitable damper 49, while an ash-receiver 50 is mounted on the wall 9 below the same. A grate 51, located within the fire-box, extends to a division-wall 52, arranged transversely in the rear portion of the box in spaced relation to the rear end thereof.

Seed supporting or carrying means is employed in the form of an endless belt 53, that passes over the platen 34, through the frame-casing, about the drum 37, thence over the roller 33, beneath the roller 25, and consequently through the reservoir 14, over the roller 32, then about the roller 24, and consequently through the reservoir 15. This belt may be of any material desired, but is preferably canvas and is maintained in taut condition by means of the roller 25. The belt 53 carries at its opposite side edges suitable sprocket-chains 54, which engage sprocket-wheels 55, carried by the ends of the drum and various rollers, whereby the movement of all is assured. The belt receives motion from the roller 24, which has a projecting gudgeon 56, carrying a drive-pulley 57. It will of course be understood that the power for driving the mechanism may be secured from any suitable source.

The means for feeding or directing seed to the belt consists of a hopper 58, mounted upon the upper ends of the standards 8 and having seed-delivering devices 59, located beneath the same and operated by a shaft 60. The shaft 60 carries a pulley 61, about which passes a belt 62, driven from the gudgeon 56, which gudgeon has a small pulley 63, that receives the belt 62. Beneath the seed-delivering devices 59 is arranged a chute-plate 64, inclined downwardly toward the belt and mounted upon a rock-shaft 65, having an arm 66 arranged at one side of the frame and adapted to engage a quadrant-rack 67. Scrapers 68 are located beneath the lower stretch of the carrier-belt 53 and above the chutes 17 and 18, said scrapers being carried by rock-shafts 69, having arms 70 arranged at one side of the frame and engaging quadrant-racks 71.

Fan-casings 72 are mounted upon the sides of the frame at the end contiguous to the drum. These casings communicate with a transversely-disposed air-shaft 73, which connects with an inlet-conduit 74, communicating with the outlet 13 of the drum-casing, as shown in Fig. 5. Beneath the outlet 13 the conduit 74 tapers downwardly and forms a discharge-hopper 75, normally closed by a downwardly-opening valve 76, said valve being held in its closed position by a spring 77. Fans 78 are located in the casings 72 and are both mounted on a shaft 79, driven from any suitable source of power. The casings have upwardly-extending discharge-spouts 80.

The belt 53 is driven in the direction of the arrow illustrated in Fig. 5. It will thus be apparent that said belt in passing about the roller 24 and through the reservoir 15 will become moistened just prior to its passage beneath the seed-directing chute 64. The mixed seed is placed in a hopper and is fed in proper volume to the chute, gravitating down the same onto the moistened portion of the belt. The belt carries it into the casing 9 10 and about the drum 37. Said drum being heated in connection with the draft of air created by the fans 78 will cause the belt to become rapidly dried; but in the meantime those seeds which are mucilaginous in their nature have become stuck to the belt because of the action of the moisture thereupon and will all the more strongly adhere after they have become dry. The others, however, as soon as they have dried will gravitate from the belt into the casing and thence through the discharge-opening 13 into the hopper 75. When the weight therein has become sufficient, the valve 76 will become opened and permit their discharge into any suitable reservoir placed therebelow. The adhering seed, however, will be carried by the belt over the roller 33 and against the first scraper 68. This will remove the greater portion, which will gravitate into the chute 18 and be collected at the discharge-spout thereof. The remainder, however, which does not become detached, will pass through the reservoir 14, where the belt is remoistened, and afterward passed over the scraper 68. This scraper not only removes the remainder of the seed, but also effects the cleansing of the belt from the slime and mucilaginous substance that collects thereon. A further movement carries the portion of the belt through the reservoir of clean water 15 and thence again through the circuit described.

It will be apparent that this apparatus will effect the separation of the different classes of seed mentioned by making use of their different mucilaginous natures and that the same is carried out with ease and expedition. The seed, moreover, is not injured by the moisture, as it is quickly dried after the application of the same and, furthermore, is rapidly removed from the heat, so that it is not affected by the latter. The rapid drying action is secured not only by the heated drum, but also by the current of air maintained through the casing surrounding said drum, the fans drawing in fresh air and removing that which has become laden with moisture.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In seed-separating apparatus, the combination with a rotary drum, of a furnace located in the drum, a carrier-belt passing around the drum, means for moistening the belt prior to its passage about the drum, and means for feeding seed to the belt between the moistening means and drum.

2. In seed-separating apparatus, the combination with heating means including a rotary drum, of a carrier-belt passing around the drum, means for moistening the belt prior to its passage about the drum, and means for feeding seed to the belt between the moistening means and the drum.

3. In seed-separating apparatus, the combination with a carrier-belt, of a drum about which said belt passes and a non-rotatable furnace located within the drum.

4. In seed-separating apparatus, the combination with a carrier-belt, of a rotary drum about which said belt passes, a furnace located within the drum, and roller-bearings interposed between the drum and the furnace.

5. In seed-separating apparatus, the combination with a supporting-frame, of a furnace extending through the same and having a door at one end and a smoke-stack at the other end, of a drum revolubly mounted about the furnace, and a carrier-belt passing over the drum.

6. In seed-separating apparatus, the combination with a casing, of a fire-box removably mounted in the casing, a drum revoluble about the casing, and a carrier-belt passing over the drum.

7. In seed-separating apparatus, the combination with a casing, of a fire-box removably mounted in the casing, means for moving the fire-box, a drum revolubly mounted on the casing, and a carrier-belt passing about the drum.

8. In seed-separating apparatus, the combination with a casing, of a fire-box removably mounted in the casing, a rack secured to the fire-box, an actuating-pinion engaging the rack, a drum revolubly mounted on the casing, and a carrier-belt passing about the drum.

9. In seed-separating apparatus, the combination with a frame, of a stationary casing secured transversely in the frame, a fire-box removably mounted in the casing, a drum revolubly mounted on the casing, roller-bearings interposed between the drum and casing, and a carrier-belt passing about the drum.

10. In seed-separating apparatus, the combination with a belt, of means for applying moisture and seed to the belt, means for drying the belt with the seed thereon, means for rewetting the belt, and a scraper for removing the seed after the belt has become rewet.

11. In seed-separating apparatus, the combination with a carrier-belt, of means for applying moisture and seed to the belt, means for drying the belt with the seed thereon, a reservoir for liquid, means for guiding the belt through the reservoir, and a scraper coacting with the belt in rear of the reservoir.

12. In seed-separating apparatus, the combination with a carrier-belt, of spaced reservoirs through which the belt passes, a scraper located between the reservoirs, means for directing seed to the belt, and a drier coacting with the belt in rear of the seed-directing means.

13. In seed-separating apparatus, the combination with an endless carrier-belt having upper and lower stretches, of means for directing seed to the belt located above the upper stretch, and a drier located between the stretches contiguous to one end of the same, spaced reservoirs for liquid located beneath the lower stretch, rollers for guiding the belt through the reservoirs, and scrapers coacting with the lower stretch of the belt.

14. In seed-separating apparatus, the combination with a frame, of a roller located at one end of the frame, a heating-drum located at the other end of the frame, an endless carrier-belt passing about the roller and about the drum, said belt having upper and lower stretches, means for feeding seed to the upper stretch of the belt, a liquid-reservoir in which the roller is located, another reservoir located between said roller and the drum, a guide-roller for directing the belt through said latter reservoir, and scrapers coacting with the belt on opposite sides of the guideway.

15. In seed-separating apparatus, the combination with a carrier-belt, of a heating-drum around which the belt passes, and means for passing a current of air about the drum and over the belt.

16. In seed-separating apparatus, the combination with a carrier-belt, of a heating-drum around which said belt passes, means for heating the drum, a casing partially surrounding the drum, and a fan for creating a current of air through the space between the casing and drum.

17. In seed-separating apparatus, the combination with a revoluble heating-drum, of means for heating the same, a casing surrounding the drum, a carrier-belt passing about the drum and through the casing, means for moistening and applying seed to the belt, and a fan having communication with the casing for creating drafts of air therethrough.

18. In seed-separating apparatus, the combination with a drum, of a casing partially surrounding the same, a carrier-belt passing through the casing and around the drum, means for moistening and applying seed to the belt, and a seed-receiver located in the casing below the drum.

19. In seed-separating apparatus, the combination with a revoluble drum, of a casing surrounding the same and having a seed-outlet in its lower portion, means for heating the drum, an endless carrier-belt passing about the drum and through the casing, means for moistening the belt and applying seed thereto, and a fan for creating a current of air through the casing and about the drum.

20. In seed-separating apparatus, the combination with a revoluble drum, of means for heating the same, a casing surrounding the drum and having a valved outlet in its lower portion, a fan-casing having an inlet communicating with the said outlet, a fan located in the casing, a carrier-belt passing through the casing and about the drum, and means for moistening and applying seed to the belt.

21. In seed-separating apparatus, the combination with a supporting-frame, of a liquid-reservoir located therein, rollers journaled on the frame, an endless carrier-belt passing about the rollers, means for drying the belt, means for feeding seed thereto, and a spring-pressed tension-roller supported in the frame and bearing against the belt, said roller being located in the reservoir.

22. In seed-separating apparatus, the combination with a frame, one end of said frame comprising a casing, of spaced liquid-reservoirs supported in the frame, rollers journaled in the frame and located in the reservoirs, one of said rollers being yieldingly supported, a drum located in the casing, means for heating the drum, a seed-outlet arranged in the lower portion of the casing, a fan having communication with the seed-outlet, an endless carrier-belt passing about the drum and roller, scrapers coacting with the belt, and seed-feeding means for directing grain and seed to the belt.

In testimony that I claim the foregoing as my own I have hereto affixed my signature in the presence of two witnesses.

EDSON POTTER.

Witnesses:
WILLIAM FLEMING,
J. L. MAUDLIN.